UNITED STATES PATENT OFFICE.

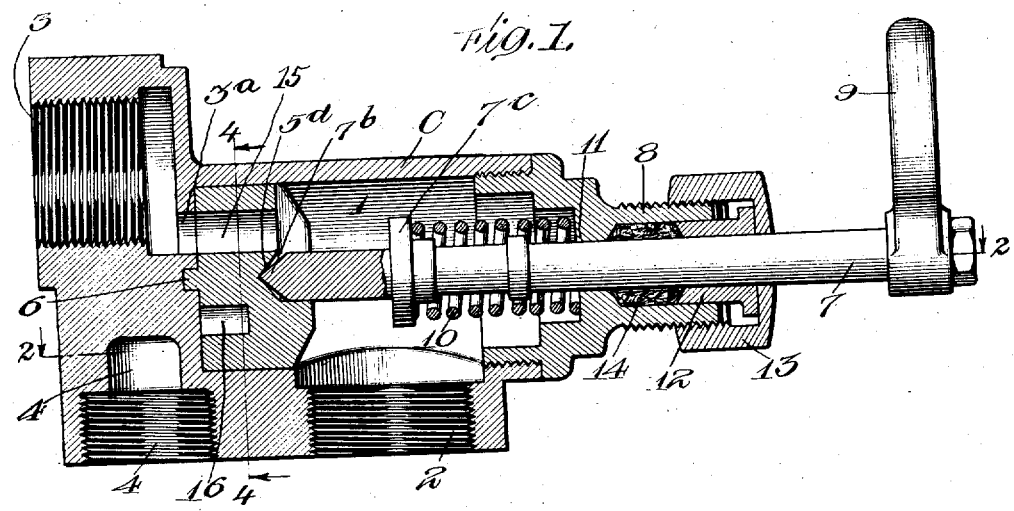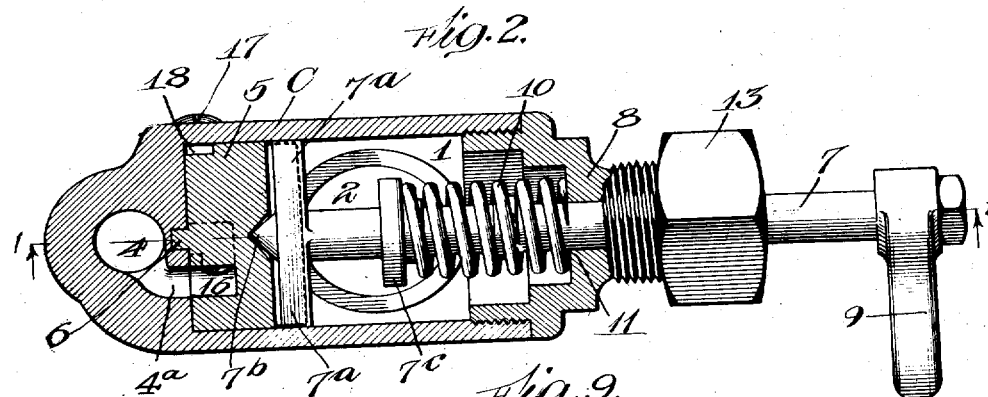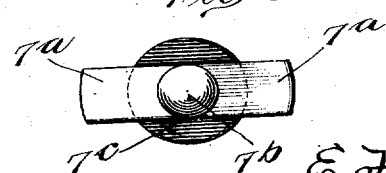

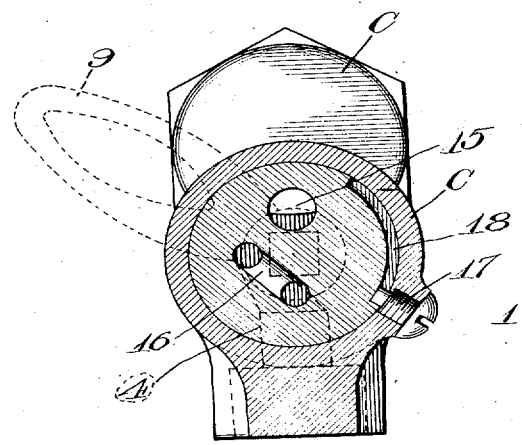
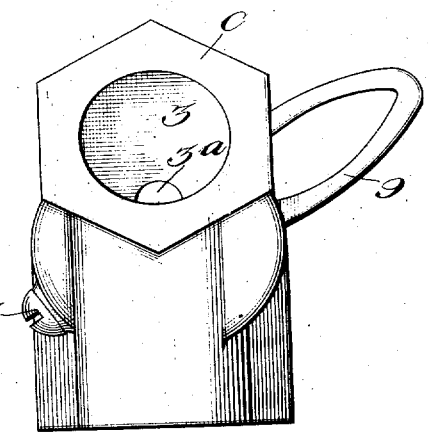
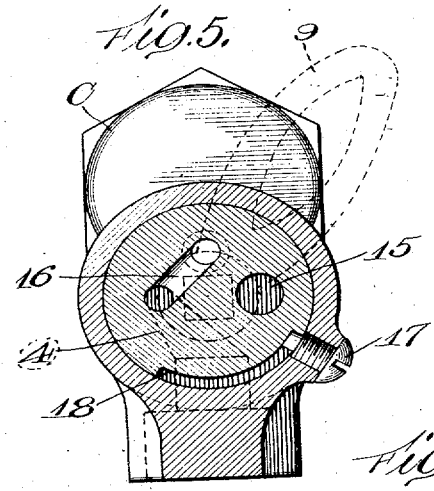
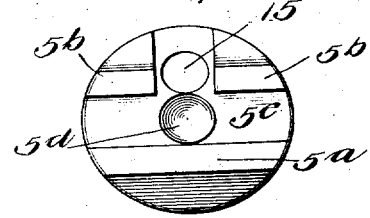
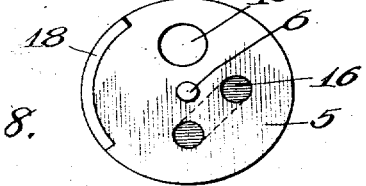
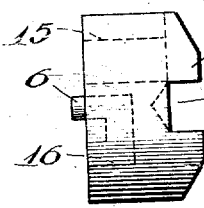

EGBERT H. GOLD, OF CHICAGO, ILLINOIS.

VALVE.

No. 914,407.　　　Specification of Letters Patent.　　　Patented March 9, 1909.

Application filed December 14, 1905. Serial No. 291,759.

*To all whom it may concern:*

Be it known that I, EGBERT H. GOLD, a citizen of the United States, residing at Chicago, in the county of Cook and State of Illinois, have invented certain new and useful Improvements in Valves, of which the following is a specification.

This invention relates to improvements in valves and is particularly adapted for use as a supply-valve for a car-heating system, or other fluid distributing system wherein it is desirable that no condensed fluid be permitted to remain in the pipes or other distributing or radiating means after the valve has been closed.

The object of my invention is to provide a device of the above-described class, which shall positively shut off the supply of steam or other fluid, and which shall, at the same time, and by the same manual operation, open a drip passage.

A further object of my invention is the production of a device which, while meeting the above requirements, is neither expensive to manufacture nor likely to get out of order.

These and such other objects as may hereinafter appear are attained by my invention, a convenient embodiment of which is shown in the drawings, in which:

Figure 1 is a vertical sectional view of the device, the section being taken on the line 1—1 of Fig. 2, looking in the direction indicated by the arrows. Fig. 2 is a sectional view of the same, taken on the line 2—2 of Fig. 1, looking in the direction indicated by the arrows. Fig. 3 is an elevational end view of the same, looking into the outlet-port. Fig. 4 shows a vertical section on the line 4—4 of Fig. 1, looking in the direction indicated by the arrows. Fig. 5 shows a similar section with the parts in the reversed position. Fig. 6 is an elevational face view of the valve-piece, the latter being removed from the valve. Fig. 7 is an elevational rear view of the same part. Fig. 8 is a side or edge view of the same part, showing the same in elevation; and Fig. 9 is an end view of the valve-stem.

The valve casing C is provided with a valve chamber 1, an inlet-port 2 adapted to communicate with the feed pipe of the system, an outlet-port 3 leading from the valve chamber to the distributing pipe of the system, and a drip-port 4, which leads from the valve chamber 1 to the atmosphere through a waste-pipe.

One end of the valve chamber 1 constitutes a valve-seat, upon which is mounted a valve-piece 5, which is centered upon the valve-seat by means of a projection 6. Arranged to have axial rotation in the valve casing is a valve-stem 7 which extends through a stuffing-box 8, and is provided upon its outer end with a handle 9. The valve-piece 5 and the inner end of the valve-stem 7 are provided with means adapted to interlock, whereby rotation of the valve stem is imparted to the valve-piece. Such interlocking means may conveniently comprise a laterally extending wing $7^a$ upon each side of the valve-stem 7, and projections $5^a$ and $5^b$ upon the valve-piece 5. The substantially T-shaped end of the valve-stem thus formed is adapted to enter a channel $5^c$ between the projections $5^a$ and $5^b$ upon the valve-piece 5. The end of the valve-stem is provided with a cone-shaped projection or point $7^b$ adapted to engage the valve-piece, the point or projection $7^b$ being preferably of sufficient height to prevent the wings $7^a$ from contacting squarely with the bottom of the channel $5^c$. Suitable means is employed for thrusting the valve-stem toward the valve-piece, and such means consisting of a spring 10, this spring being seated against a suitable flange 11 in the stuffing-box 8 and thrusting against a collar $7^c$ on the valve-stem.

It will be understood, from the above description, that the thrust of the valve-stem 7 upon the valve-piece 5 under the influence of said spring is exerted upon approximately a single point, that point being at the center of the valve-piece. As the face of the valve-piece and the seat against which the valve-piece is held are planes, it is evident that these parts must always be squarely in contact with each other, and since the valve-piece and valve stem are not integral the necessity for nice fitting and expensive machinery is avoided because there is no tendency for the face of the valve-piece to get out of perfect alinement with the valve-seat by reason of wear or from any other cause, as would be the case if the valve-piece and stem were made in one piece. A bland 12 surrounds the valve-stem 7 and is adapted to be moved inwardly by tightening the nut 13. Between the flange 11 and gland 12 is arranged suitable packing material 14 which is compressed by the tightening of the nut 13 in a familiar manner. The valve-seat is formed with two openings therethrough, the opening $3^a$ effecting communication between the valve-chamber 1 and the outlet-port 3, the other opening 4ª leading from the valve-chamber to the drip-port 4. The valve-piece 5 is provided with a passage-way 15 extending directly therethrough, and with a diving passage-way 16 which opens at both ends upon the valve-seat. The passage-way 15 is adapted to establish communication between the inlet-port 2 and the outlet-port 3, through the valve-chamber 1 when the passage-way 16 is closed, while the passage-way 16 is adapted to establish communication between the outlet-port 3 and the drip-port 4 when the passage-way 15 is closed.

In Figs. 1, 2, 3, and 4, the parts are shown in the position which they assume when the valve is open, the passage-way 15 registering with the outlet 3ª leading to the port 3, communication being thus established between the inlet-port 2 and the outlet-port 3, through the chamber 1.

Fig. 5 shows the valve closed, the passage-way 15 being obstructed by the solid face of the valve-seat. The drip-port 4 and the outlet-port 3 are in communication with each other through the passage-way 16, one end of which registers with the opening 3ª and the other with the opening 4ª. Convenient means for limiting the movement of the valve-piece 5 are shown, consisting of a stud-screw 17 which is inserted through the wall of the casing, and projects into a suitable channel 18 in the valve-piece.

From the foregoing description the operation of my valve is obvious. With the parts arranged in relation to each other as shown, a given adjustment will establish communication between the supply-pipe and the distributing pipe through the valve chamber 1 and passage-way 15. When it is desired to shut off the inflow of steam, the rotation of the valve upon its seat will first close the passage-way 15, and then the continuous rotation of the valve-piece will bring one end of the passage-way 16 into communication with the outlet-port 3 and the other end into communication with the drip-port 4, so that any fluid thereafter entering the distributing pipe adjacent to the valve-casing will gravitate through the passage-way 16 and out of the waste-port 4.

Having thus described my invention what I claim as new and desire to secure by Letters-Patent is:

The combination with a casing constituting a valve chamber and having an inlet port and a valve seat at one end thereof in which is an outlet port and a drip port, of a rotatable valve-piece pivotally mounted on said valve seat and having passage-ways therethrough by means of which, with one position of the valve piece, the valve chamber is in communication with the outlet port and the drip port closed, while in another position the outlet port is closed and communication opened between the chamber and the drip part, a stem for the valve piece terminating in a point, the valve piece having a corresponding socket and being diametrically channeled, projections extending from the stem into the channel in the valve piece so as to be out of contact with the bottom of the channel, a spring to force the stem against the valve piece, and an operating handle on the stem, whereby the parts adjust themselves to accommodate for uneven wear, substantially as described.

EGBERT H. GOLD.

Witnesses:
G. Y. DANKWARD,
H. L. PECK.

---

It is hereby certified that in Letters Patent No. 914,407, granted March 9, 1909, upon the application of Egbert H. Gold, of Chicago, Illinois, for an improvement in "Valves," an error appears in the printed specification requiring correction, as follows: In line 104, page 1, the word "bland" should read *gland;* and that the said Letters Patent should be read with this correction therein that the same may conform to the record of the case in the Patent Office.

Signed and sealed this 6th day of April, A. D., 1909.

[SEAL.]

C. C. BILLINGS,
*Acting Commissioner of Patents.* tween the valve-chamber 1 and the outlet-port 3, the other opening 4ᵃ leading from the valve-chamber to the drip-port 4. The valve-piece 5 is provided with a passage-way 15 extending directly therethrough, and with a diving passage-way 16 which opens at both ends upon the valve-seat. The passage-way 15 is adapted to establish communication between the inlet-port 2 and the outlet-port 3, through the valve-chamber 1 when the passage-way 16 is closed, while the passage-way 16 is adapted to establish communication between the outlet-port 3 and the drip-port 4 when the passage-way 15 is closed.

In Figs. 1, 2, 3, and 4, the parts are shown in the position which they assume when the valve is open, the passage-way 15 registering with the outlet 3ᵃ leading to the port 3, communication being thus established between the inlet-port 2 and the outlet-port 3, through the chamber 1.

Fig. 5 shows the valve closed, the passage-way 15 being obstructed by the solid face of the valve-seat. The drip-port 4 and the outlet-port 3 are in communication with each other through the passage-way 16, one end of which registers with the opening 3ᵃ and the other with the opening 4ᵃ. Convenient means for limiting the movement of the valve-piece 5 are shown, consisting of a stud-screw 17 which is inserted through the wall of the casing, and projects into a suitable channel 18 in the valve-piece.

From the foregoing description the operation of my valve is obvious. With the parts arranged in relation to each other as shown, a given adjustment will establish communication between the supply-pipe and the distributing pipe through the valve chamber 1 and passage-way 15. When it is desired to shut off the inflow of steam, the rotation of the valve upon its seat will first close the passage-way 15, and then the continuous rotation of the valve-piece will bring one end of the passage-way 16 into communication with the outlet-port 3 and the other end into communication with the drip-port 4, so that any fluid thereafter entering the distributing pipe adjacent to the valve-casing will gravitate through the passage-way 16 and out of the waste-port 4.

Having thus described my invention what I claim as new and desire to secure by Letters-Patent is:

The combination with a casing constituting a valve chamber and having an inlet port and a valve seat at one end thereof in which is an outlet port and a drip port, of a rotatable valve-piece pivotally mounted on said valve seat and having passage-ways therethrough by means of which, with one position of the valve piece, the valve chamber is in communication with the outlet port and the drip port closed, while in another position the outlet port is closed and communication opened between the chamber and the drip part, a stem for the valve piece terminating in a point, the valve piece having a corresponding socket and being diametrically channeled, projections extending from the stem into the channel in the valve piece so as to be out of contact with the bottom of the channel, a spring to force the stem against the valve piece, and an operating handle on the stem, whereby the parts adjust themselves to accommodate for uneven wear, substantially as described.

EGBERT H. GOLD.

Witnesses:
G. Y. DANKWARD,
H. L. PECK.

---

It is hereby certified that in Letters Patent No. 914,407, granted March 9, 1909, upon the application of Egbert H. Gold, of Chicago, Illinois, for an improvement in "Valves," an error appears in the printed specification requiring correction, as follows: In line 104, page 1, the word "bland" should read *gland;* and that the said Letters Patent should be read with this correction therein that the same may conform to the record of the case in the Patent Office.

Signed and sealed this 6th day of April, A. D., 1909.

[SEAL.]

C. C. BILLINGS,

*Acting Commissioner of Patents.*

It is hereby certified that in Letters Patent No. 914,407, granted March 9, 1909, upon the application of Egbert H. Gold, of Chicago, Illinois, for an improvement in "Valves," an error appears in the printed specification requiring correction, as follows: In line 104, page 1, the word "bland" should read *gland;* and that the said Letters Patent should be read with this correction therein that the same may conform to the record of the case in the Patent Office.

Signed and sealed this 6th day of April, A. D., 1909.

[SEAL.]

C. C. BILLINGS,
*Acting Commissioner of Patents.*